(12) United States Patent
Pang et al.

(10) Patent No.: US 10,644,543 B1
(45) Date of Patent: May 5, 2020

(54) EYE-MOUNTED DISPLAY SYSTEM INCLUDING A HEAD WEARABLE OBJECT

(71) Applicant: Spy Eye, LLC, Palo Alto, CA (US)

(72) Inventors: Hawk Yin Pang, San Jose, CA (US); Herbert John Kniess, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 16/227,139

(22) Filed: Dec. 20, 2018

(51) Int. Cl.
| | |
|---|---|
| *H02J 50/12* | (2016.01) |
| *H02J 50/80* | (2016.01) |
| *G02C 7/04* | (2006.01) |
| *G06F 3/041* | (2006.01) |

(52) U.S. Cl.
CPC .............. *H02J 50/12* (2016.02); *G02C 7/04* (2013.01); *G06F 3/041* (2013.01); *H02J 50/80* (2016.02)

(58) Field of Classification Search
CPC ............. G06K 19/073; G06K 7/10158; G06K 19/0716; H04W 4/60; H04W 4/50; A61B 2562/08
See application file for complete search history.

(56) References Cited

U.S. PATENT DOCUMENTS

| | | |
|---|---|---|
| 4,014,321 A | 3/1977 | March |
| 4,577,545 A | 3/1986 | Kemeny |
| 4,871,247 A | 10/1989 | Haynes |
| 4,941,068 A | 7/1990 | Hofmann |
| 5,331,149 A | 7/1994 | Spitzer |
| 5,467,104 A | 11/1995 | Furness, III |
| 5,638,218 A | 6/1997 | Oomura |
| 5,638,219 A | 6/1997 | Medina Puerta |

(Continued)

FOREIGN PATENT DOCUMENTS

| | | |
|---|---|---|
| CA | 2280022 | 1/2001 |
| CA | 2280022 A1 | 1/2001 |

(Continued)

OTHER PUBLICATIONS

Avestruz, A-T. et al., "Single-Sided AC Magnetic Fields for Induction Heating," 39th Annual Conference of the IEEE, Nov. 10-13, 2013, pp. 5052-5057._.

(Continued)

*Primary Examiner* — Nelson M Rosario
(74) *Attorney, Agent, or Firm* — Fenwick & West LLP

(57) ABSTRACT

An augmented reality system can include an electronic contact lens, a power source, and a head wearable object. The contact lens, power source, and head wearable object all include corresponding conductive loops to enable wireless transfer of power between the power source and the contact lens. When current is driven through a conductive loop of the power source, the power source generates a primary time-varying magnetic field. The primary time varying magnetic field induces a current in a conductive loop of the head wearable object. The induced current in the head wearable object generates a secondary time-varying magnetic field. Both the primary and secondary time varying magnetic field generate a current in the conductive loop of the contact lens. The system can also include a haptic feedback system that allows information to be communicated between elements of the system.

21 Claims, 13 Drawing Sheets

(56) References Cited

U.S. PATENT DOCUMENTS

| | | |
|---|---|---|
| 5,682,210 A | 10/1997 | Weirich |
| 5,699,193 A | 12/1997 | Monno |
| 5,712,721 A | 1/1998 | Large |
| 5,726,916 A | 3/1998 | Smyth |
| 6,120,460 A | 9/2000 | Abreu |
| 6,181,287 B1 | 1/2001 | Beigel |
| 6,215,593 B1 | 4/2001 | Bruce |
| 6,307,945 B1 | 10/2001 | Hall |
| 6,312,393 B1 | 11/2001 | Abreu |
| 6,509,743 B1 | 1/2003 | Ferrero |
| 6,570,386 B2 | 5/2003 | Goldstein |
| 6,594,370 B1 | 7/2003 | Anderson |
| 6,823,171 B1 | 11/2004 | Kaario |
| 6,851,805 B2 | 2/2005 | Blum |
| 6,920,283 B2 | 7/2005 | Goldstein |
| 7,088,235 B1 | 8/2006 | Carricut |
| 7,137,952 B2 | 11/2006 | Leonardi |
| 7,359,059 B2 | 4/2008 | Lust |
| 7,562,445 B2 | 7/2009 | Lerch |
| 7,626,562 B2 | 12/2009 | Iwasaki |
| 7,758,187 B2 | 7/2010 | Amirparviz |
| 7,835,056 B2 | 11/2010 | Doucet |
| 7,893,832 B2 | 2/2011 | Laackmann |
| 7,931,832 B2 | 4/2011 | Pugh |
| 8,077,245 B2 | 12/2011 | Adamo |
| 8,087,777 B2 | 1/2012 | Rosenthal |
| 8,096,654 B2 | 1/2012 | Amirparviz |
| 8,348,422 B2 | 1/2013 | Pugh |
| 8,348,424 B2 | 1/2013 | Pugh |
| 8,394,660 B2 | 3/2013 | Kim |
| 8,398,239 B2 | 3/2013 | Horning |
| 8,430,310 B1 | 4/2013 | Ho |
| 8,441,731 B2 | 5/2013 | Sprague |
| 8,446,341 B2 | 5/2013 | Amirparviz |
| 8,482,858 B2 | 7/2013 | Sprague |
| 8,520,309 B2 | 8/2013 | Sprague |
| 8,526,879 B2 | 9/2013 | Kristiansen |
| 8,579,434 B2 | 11/2013 | Amirparviz |
| 8,582,209 B1 | 11/2013 | Amirparviz |
| 8,608,310 B2 | 12/2013 | Otis |
| 8,632,182 B1 | 1/2014 | Chen |
| 8,721,074 B2 | 5/2014 | Pugh |
| 8,764,185 B1 | 7/2014 | Biederman |
| 8,781,570 B2 | 7/2014 | Chuang |
| 8,786,520 B2 | 7/2014 | Legerton |
| 8,786,675 B2 | 7/2014 | Deering |
| 8,798,332 B2 | 8/2014 | Otis |
| 8,827,445 B1 | 9/2014 | Wiser |
| 8,830,571 B1 | 9/2014 | Vizgaitis |
| 8,870,370 B1 | 10/2014 | Otis |
| 8,874,182 B2 | 10/2014 | Etzkorn |
| 8,906,088 B2 | 12/2014 | Pugh |
| 8,911,078 B2 | 12/2014 | Meyers |
| 8,922,898 B2 | 12/2014 | Legerton |
| 8,926,809 B2 | 1/2015 | Pletcher |
| 8,931,906 B2 | 1/2015 | Huang |
| 8,960,898 B1 | 2/2015 | Etzkorn |
| 8,963,268 B2 | 2/2015 | Kim |
| 8,964,298 B2 | 2/2015 | Haddick |
| 8,971,978 B2 | 3/2015 | Ho |
| 8,985,763 B1 | 3/2015 | Etzkorn |
| 8,989,834 B2 | 3/2015 | Ho |
| 9,000,000 B2 | 4/2015 | Carroll |
| 9,028,068 B2 | 5/2015 | Chang |
| 9,039,171 B2 | 5/2015 | Groisman |
| 9,040,923 B2 | 5/2015 | Sprague |
| 9,047,512 B2 | 6/2015 | Otis |
| 9,048,389 B2 | 6/2015 | Fu |
| 9,052,528 B2 | 6/2015 | Pugh |
| 9,052,533 B2 | 6/2015 | Pugh |
| 9,054,079 B2 | 6/2015 | Etzkorn |
| 9,058,053 B2 | 6/2015 | Covington |
| 9,063,351 B1 | 6/2015 | Ho |
| 9,063,352 B2 | 6/2015 | Ford |
| 9,111,473 B1 | 8/2015 | Ho |
| 9,130,099 B2 | 9/2015 | Robin |
| 9,130,122 B2 | 9/2015 | Fu |
| 9,134,546 B2 | 9/2015 | Pugh |
| 9,153,074 B2 | 10/2015 | Zhou |
| 9,158,133 B1 | 10/2015 | Pletcher |
| 9,161,712 B2 | 10/2015 | Etzkorn |
| 9,170,646 B2 | 10/2015 | Toner |
| 9,178,107 B2 | 11/2015 | Tsai |
| 9,192,298 B2 | 11/2015 | Bouwstra |
| 9,195,075 B2 | 11/2015 | Pugh |
| 9,196,094 B2 | 11/2015 | Ur |
| 9,215,293 B2 | 12/2015 | Miller |
| 9,217,881 B2 | 12/2015 | Pugh |
| 9,225,375 B2 | 12/2015 | Pugh |
| 9,244,285 B2 | 1/2016 | Chen |
| 9,271,677 B2 | 3/2016 | Leonardi |
| 9,282,920 B2 | 3/2016 | Ho |
| 9,289,123 B2 | 3/2016 | Weibel |
| 9,289,954 B2 | 3/2016 | Linhardt |
| 9,298,002 B2 | 3/2016 | Border |
| 9,298,020 B1 | 3/2016 | Etzkorn |
| D754,861 S | 4/2016 | Etzkorn |
| 9,307,905 B2 | 4/2016 | Varel |
| 9,310,626 B2 | 4/2016 | Pugh |
| 9,316,848 B2 | 4/2016 | Pugh |
| 9,326,710 B1 | 5/2016 | Liu |
| 9,332,935 B2 | 5/2016 | Etzkorn |
| 9,335,562 B2 | 5/2016 | Pugh |
| 9,341,843 B2 | 5/2016 | Border |
| 9,366,872 B2 | 6/2016 | Honea |
| 9,366,881 B2 | 6/2016 | Pugh |
| 9,389,433 B2 | 7/2016 | Pugh |
| 9,401,454 B2 | 7/2016 | Robin |
| 9,414,746 B2 | 8/2016 | Bergman |
| 9,425,359 B2 | 8/2016 | Tsai |
| 9,442,307 B2 | 9/2016 | Meyers |
| 9,442,310 B2 | 9/2016 | Biederman |
| 9,445,768 B2 | 9/2016 | Alexander |
| 9,523,865 B2 | 12/2016 | Pletcher |
| 9,629,774 B2 | 4/2017 | Dayal |
| 9,728,981 B2 | 8/2017 | Lee |
| 9,810,926 B2 | 11/2017 | Sako |
| 9,939,658 B1 | 4/2018 | Gutierrez |
| 1,002,511 A1 | 7/2018 | Markus |
| 1,027,864 A1 | 5/2019 | Etzkorn |
| 2002/0084904 A1 | 7/2002 | De La Huerga |
| 2002/0101383 A1 | 8/2002 | Junod |
| 2003/0173408 A1 | 9/2003 | Mosher |
| 2003/0179094 A1 | 9/2003 | Abreu |
| 2004/0027536 A1 | 2/2004 | Blum |
| 2005/0179604 A1 | 8/2005 | Liu |
| 2006/0177086 A1 | 8/2006 | Rye |
| 2006/0290882 A1 | 12/2006 | Meyers |
| 2007/0024423 A1 | 2/2007 | Nikitin |
| 2007/0241986 A1 | 10/2007 | Lee |
| 2008/0165072 A1 | 7/2008 | Schlager |
| 2009/0058189 A1 | 3/2009 | Cook |
| 2009/0066722 A1 | 3/2009 | Kriger |
| 2009/0072628 A1 | 3/2009 | Cook |
| 2009/0244477 A1 | 10/2009 | Pugh |
| 2010/0001926 A1 | 1/2010 | Amirparviz |
| 2010/0110372 A1 | 5/2010 | Pugh |
| 2010/0136905 A1 | 6/2010 | Kristiansen |
| 2010/0234717 A1 | 9/2010 | Wismer |
| 2010/0253476 A1 | 10/2010 | Poutiatine |
| 2010/0308749 A1 | 12/2010 | Liu |
| 2011/0034134 A1 | 2/2011 | Henderson |
| 2011/0221659 A1 | 9/2011 | King, III |
| 2012/0105226 A1 | 5/2012 | Bourdeau |
| 2012/0262003 A1 | 10/2012 | Tetu |
| 2013/0050432 A1 | 2/2013 | Perez |
| 2013/0100139 A1 | 4/2013 | Schliesser |
| 2013/0242077 A1 | 9/2013 | Lin |
| 2013/0270664 A1 | 10/2013 | Kim |
| 2014/0016097 A1 | 1/2014 | Leonardi |
| 2014/0063054 A1 | 3/2014 | Osterhout |
| 2014/0081178 A1 | 3/2014 | Pletcher |
| 2014/0098226 A1 | 4/2014 | Pletcher |
| 2014/0120983 A1 | 5/2014 | Lam |

(56) References Cited

U.S. PATENT DOCUMENTS

| | | | |
|---|---|---|---|
| 2014/0192311 A1* | 7/2014 | Pletcher | G02C 7/04 351/158 |
| 2014/0198128 A1 | 7/2014 | Hong | |
| 2014/0240665 A1 | 8/2014 | Pugh | |
| 2014/0252868 A1 | 9/2014 | Yamada | |
| 2014/0292620 A1 | 10/2014 | Lapstun | |
| 2014/0371560 A1 | 12/2014 | Etzkorn | |
| 2015/0005604 A1 | 1/2015 | Biederman | |
| 2015/0016777 A1 | 1/2015 | Abovitz | |
| 2015/0060904 A1 | 3/2015 | Robin | |
| 2015/0062533 A1 | 3/2015 | Toner | |
| 2015/0072615 A1 | 3/2015 | Mofidi | |
| 2015/0088253 A1 | 3/2015 | Doll | |
| 2015/0123785 A1 | 5/2015 | Haflinger | |
| 2015/0126845 A1 | 5/2015 | Jin | |
| 2015/0145095 A1 | 5/2015 | Kim | |
| 2015/0147975 A1 | 5/2015 | Li | |
| 2015/0148628 A1 | 5/2015 | Abreu | |
| 2015/0150510 A1 | 6/2015 | Leonardi | |
| 2015/0171274 A1 | 6/2015 | Guo | |
| 2015/0173602 A1 | 6/2015 | Barrows | |
| 2015/0223684 A1 | 8/2015 | Hinton | |
| 2015/0227735 A1 | 8/2015 | Chappell | |
| 2015/0234205 A1 | 8/2015 | Schowengerdt | |
| 2015/0235439 A1 | 8/2015 | Schowengerdt | |
| 2015/0235440 A1 | 8/2015 | Schowengerdt | |
| 2015/0235444 A1 | 8/2015 | Schowengerdt | |
| 2015/0235446 A1 | 8/2015 | Schowengerdt | |
| 2015/0235457 A1 | 8/2015 | Schowengerdt | |
| 2015/0235468 A1 | 8/2015 | Schowengerdt | |
| 2015/0235471 A1 | 8/2015 | Schowengerdt | |
| 2015/0241698 A1 | 8/2015 | Schowengerdt | |
| 2015/0243090 A1 | 8/2015 | Schowengerdt | |
| 2015/0261294 A1 | 9/2015 | Urbach | |
| 2015/0281411 A1 | 10/2015 | Markus | |
| 2015/0301338 A1 | 10/2015 | Van Heugten | |
| 2015/0305929 A1 | 10/2015 | Goldberg | |
| 2015/0339857 A1 | 11/2015 | O'Connor | |
| 2015/0362750 A1 | 12/2015 | Yeager | |
| 2015/0362752 A1 | 12/2015 | Linhardt | |
| 2015/0363614 A1* | 12/2015 | Yeager | G06K 7/10158 340/10.5 |
| 2015/0372395 A1 | 12/2015 | Lavedas | |
| 2015/0380461 A1 | 12/2015 | Robin | |
| 2015/0380988 A1 | 12/2015 | Chappell | |
| 2016/0006115 A1 | 1/2016 | Etzkorn | |
| 2016/0011419 A1 | 1/2016 | Gao | |
| 2016/0018650 A1 | 1/2016 | Haddick | |
| 2016/0018651 A1 | 1/2016 | Haddick | |
| 2016/0018652 A1 | 1/2016 | Haddick | |
| 2016/0018653 A1 | 1/2016 | Haddick | |
| 2016/0030160 A1 | 2/2016 | Markus | |
| 2016/0049544 A1 | 2/2016 | Robin | |
| 2016/0066825 A1 | 3/2016 | Barrows | |
| 2016/0080855 A1 | 3/2016 | Greenberg | |
| 2016/0091737 A1 | 3/2016 | Kim | |
| 2016/0093666 A1 | 3/2016 | Gilet | |
| 2016/0097940 A1 | 4/2016 | Sako | |
| 2016/0113760 A1 | 4/2016 | Conrad | |
| 2016/0141449 A1 | 5/2016 | Robin | |
| 2016/0141469 A1 | 5/2016 | Robin | |
| 2016/0143728 A1 | 5/2016 | De Smet | |
| 2016/0147301 A1 | 5/2016 | Iwasaki | |
| 2016/0154256 A1 | 6/2016 | Yajima | |
| 2016/0172536 A1 | 6/2016 | Tsai | |
| 2016/0172869 A1 | 6/2016 | Park | |
| 2016/0172890 A1* | 6/2016 | Jeong | H02J 7/04 320/108 |
| 2016/0204307 A1 | 7/2016 | Robin | |
| 2016/0223842 A1 | 8/2016 | Yun et al. | |
| 2016/0253831 A1 | 9/2016 | Schwarz | |
| 2016/0261142 A1 | 9/2016 | Park | |
| 2016/0270176 A1 | 9/2016 | Robin | |
| 2016/0270187 A1 | 9/2016 | Robin | |
| 2016/0276328 A1 | 9/2016 | Robin | |
| 2016/0299354 A1 | 10/2016 | Shtukater | |
| 2017/0023793 A1 | 1/2017 | Shtukater | |
| 2017/0042480 A1 | 2/2017 | Gandhi | |
| 2017/0168322 A1 | 6/2017 | Toner | |
| 2017/0188848 A1 | 7/2017 | Banet | |
| 2017/0189699 A1 | 7/2017 | Dellamano | |
| 2017/0231337 A1 | 8/2017 | Anderson | |
| 2017/0234818 A1 | 8/2017 | Jesme | |
| 2017/0255026 A1 | 9/2017 | Rakhyani | |
| 2017/0270636 A1 | 9/2017 | Shtukater | |
| 2017/0337461 A1 | 11/2017 | Jesme | |
| 2017/0371184 A1 | 12/2017 | Shtukater | |
| 2018/0036974 A1 | 2/2018 | Hahn et al. | |
| 2018/0212313 A1 | 7/2018 | Harper | |
| 2019/0074823 A1 | 3/2019 | Der | |

FOREIGN PATENT DOCUMENTS

| | | |
|---|---|---|
| WO | 2016014118 A1 | 1/2016 |
| WO | 2016022665 A1 | 2/2016 |
| WO | 2016150630 A1 | 9/2016 |
| WO | 2016195201 A1 | 12/2016 |
| WO | 2019069555 | 7/2018 |

OTHER PUBLICATIONS

Paperno et al., A New Method for Magnetic Position and Orientation Tracking, IEEE Transactions on Magnetics, vol. 37, No. 4, Jul. 2001, pp. 1938-1940.

Kao, H-L. et al., "DuoSkin: Rapidly Prototyping On-Skin User Interfaces Using Skin-Friendly Materials," ISWC '16, ACM, Sep. 12-16, 2016, 8 pages.

Chronos Vision GmbH, "Scleral Search Coils 2D/3D," 4 pages, [Online][Retrieved Feb. 28, 2019], Retrieved from the internet <http://www.chronos-vision.de/downloads/CV Product SSC.pdf>. (4 pages).

Kenyon, R.V., "A soft Contact Lens Search Coil for Measuring Eye Movements," Vision Research, vol. 25, No. 11, pp. 1629-1633, 1985.

Lupu, R.G. et al., "A Survey of Eye Tracking Methods and Applications," Gheorghe Asachi Technical University of Iasi, Aug. 29, 2013, pp. 71-86.

Umraiya, A, "Design of Miniaturized Coil System Using Mems Technology for Eye Movement Measurement," McGill University, Montreal, Aug. 2009, pp. i-69.

* cited by examiner

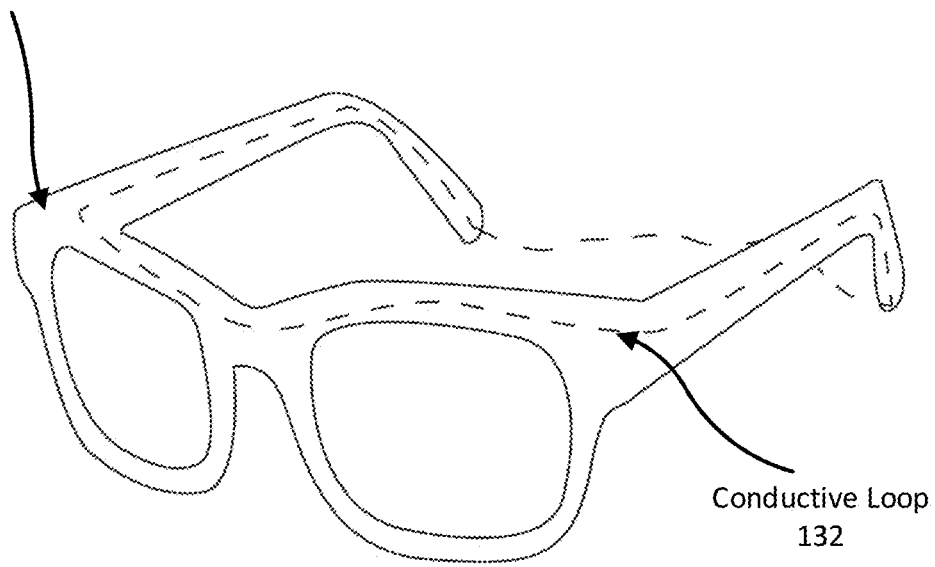

EYE-MOUNTED DISPLAY SYSTEM INCLUDING A HEAD WEARABLE OBJECT

BACKGROUND

1. Technical Field

This disclosure relates generally to eye-mounted displays and, more particularly, to providing wireless power to eye mounted displays.

2. Description of Related Art

Augmented reality (AR) adds computer-generated information to a person's view of the world around them. One type of AR system includes an electronic contact lens, for instance using tiny video projectors (or "femtoprojectors") as described in Deering (U.S. Pat. No. 8,786,675). Generally, electronic contact lenses can't accommodate batteries of sufficient capacity to power the electronic contact lenses for very long. Accordingly, providing power to the electronic contact lenses wirelessly is an attractive alternative.

BRIEF DESCRIPTION OF THE DRAWINGS

FIGS. 6B and 6C each illustrate a pair of glasses including a conductive loop.

The figures depict various embodiments for purposes of illustration only. One skilled in the art may readily recognize from the following discussion that alternative embodiments of the structures and methods illustrated herein may be employed without departing from the principles described herein.

DETAILED DESCRIPTION OF THE PREFERRED EMBODIMENTS

Introduction

An augmented reality system may include an electronic contact lens with small projectors, such as femtoprojectors, to display virtual images to a user. The projectors project images onto the user's retina that are combined with external light passing through the electronic contact lens from the user's environment. This enables a user to view images within the real world.

The AR system includes a power source (such as a wearable necklace) that generates a primary time-varying magnetic field. The AR system also includes a head wearable object (such as a hat) that includes a conductive loop. The conductive loop in the head wearable object is inductively coupled to the power source via the primary time-varying magnetic field.

The primary time-varying magnetic field generated by the power source induces a time-varying current in the conductive loop of the head wearable object. In turn, the time-varying current generates a secondary time-varying magnetic field as it passes through the conductive loop in the head wearable object.

The electronic contact lens may include an embedded conductive loop that produces a current in the presence of a time-varying magnetic field. The electronic contact lens uses the induced current to produce power.

In an AR system including only a power source, the electronic contact lens produces a first amount of power from the primary time-varying magnetic field. In an AR system including the power source and a head wearable object with a conductive loop, the electronic lens produces a second amount of power from the combination of the secondary and primary time-varying magnetic fields. The second amount of power is greater than the first amount of power due to the closer proximity of the head wearable object to the electronic contact lens relative to the proximity of the power source to the electronic contact lens. In some cases, the head wearable object may be configured to resonate at a resonant frequency thereby increasing power generated in the electronic contact lens.

The head wearable object may be, for example, a hat worn on the head. Other example head wearable objects include, a headband, a pair of earphones, a scarf, and a pair of glasses. The conductive loop can take any path through the head wearable object such that a secondary time-varying magnetic field is generated in response to being in the presence of the primary time-varying magnetic field.

Electronic Contact Lens Architecture

Figure 1:
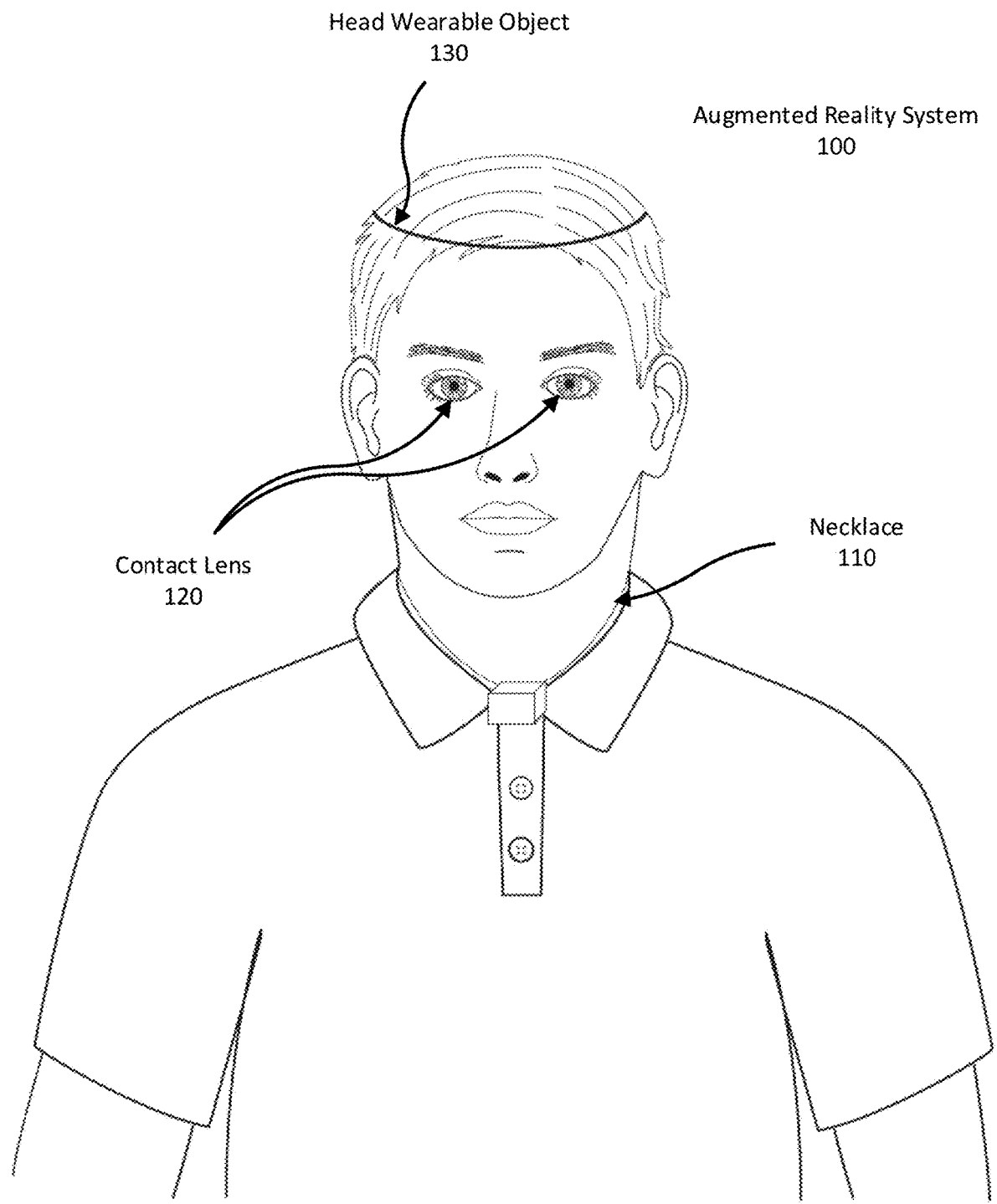
FIG. 1 is an illustration of user wearing an augmented reality system.

Turning now to the figures, FIG. 1 is an illustration of user wearing an augmented reality system. The augmented reality ("AR") system 100 includes a wireless power source and an electronic contact lens 120 ("contact lens") with a projector small enough to fit in the contact lens, such as one or more femtoprojectors. In addition to providing power to the contact lens 120, the power source can also transmit data to and receive data from the contact lens 120. In the illustrated example, the power source is a necklace 110. The AR system 100 also includes a head wearable object 130 that increases the amount of power transferred from the necklace 110 to the contact lens 120. The contact lens 120 projects images onto the retina of the wearer to create an augmented reality, such as images wirelessly received from the necklace 110.

The AR system of FIG. 1 may feel natural to the wearer because the contact lenses 120, necklace 110, and head wearable object 130 are similar to normal contacts lenses, necklaces, and head wearable objects used in everyday life. For example, the contact lenses 120 may also function as regular contact lenses that provide refractive eyesight correction, the necklace 110 may be designed to look like ordinary jewelry, and the head wearable object 130 may designed as any object that may be worn on the head, such as, for example, a sweat band or hat.

In the illustrated example, the head wearable object 130 is a conductive loop worn on the user's head. In other examples, a conductive loop may be embedded within a head wearable object 130 and the conductive loop may not be visible. The conductive loop is a conductor that may carry a time varying current ("TVC") and generate a time-varying magnetic field ("TVMF"). The conductive loop of the head wearable object 130 can inductively couple to the necklace 110 and the contact lens 120.

The head wearable object 130 may include hardware elements that provide added functionality to the AR system. For example, the head wearable object may include a feedback circuit that communicates with the necklace 110 and/or contact lens 120, allowing a user to communicate information to the necklace 110 and/or contact lens 120 by interacting with the head wearable object 130. In some example AR systems, the feedback circuit may be used to tune and/or detune a resonant frequency of a resonant loop included in a head wearable object 130.

The necklace 110 may include additional hardware elements within its band that can provide added functionality to the AR system. For example, the necklace 110 can communicatively couple to a smartphone, receive image data or other information from an application running on the smartphone, and provide power generation data to the application for display by the smartphone. The necklace may also replace the smartphone rather than merely communicate with it. The necklace 110 may also include a feedback circuit that allows a user to communicate with the contact lens 120 by interacting with the necklace 110.

As illustrated in FIG. 1, the power source is a necklace 110 that generates a TVMF and that can inductively couple to the head wearable object 130 and/or the contact lens 120. In other embodiments the power source may be a device other than a necklace. For example, in some cases, the power source may be integrated into another type of wearable device that can be worn around the neck such as a necktie, a scarf, a belt, the collar of a shirt, the sleeve of a sweater, the front of a t-shirt, etc. In other examples, the power source may be an external device or structure. As an example, the power source may be a smart phone, a table-top box, or a power source coupled to the walls of an office.

Figure 2:
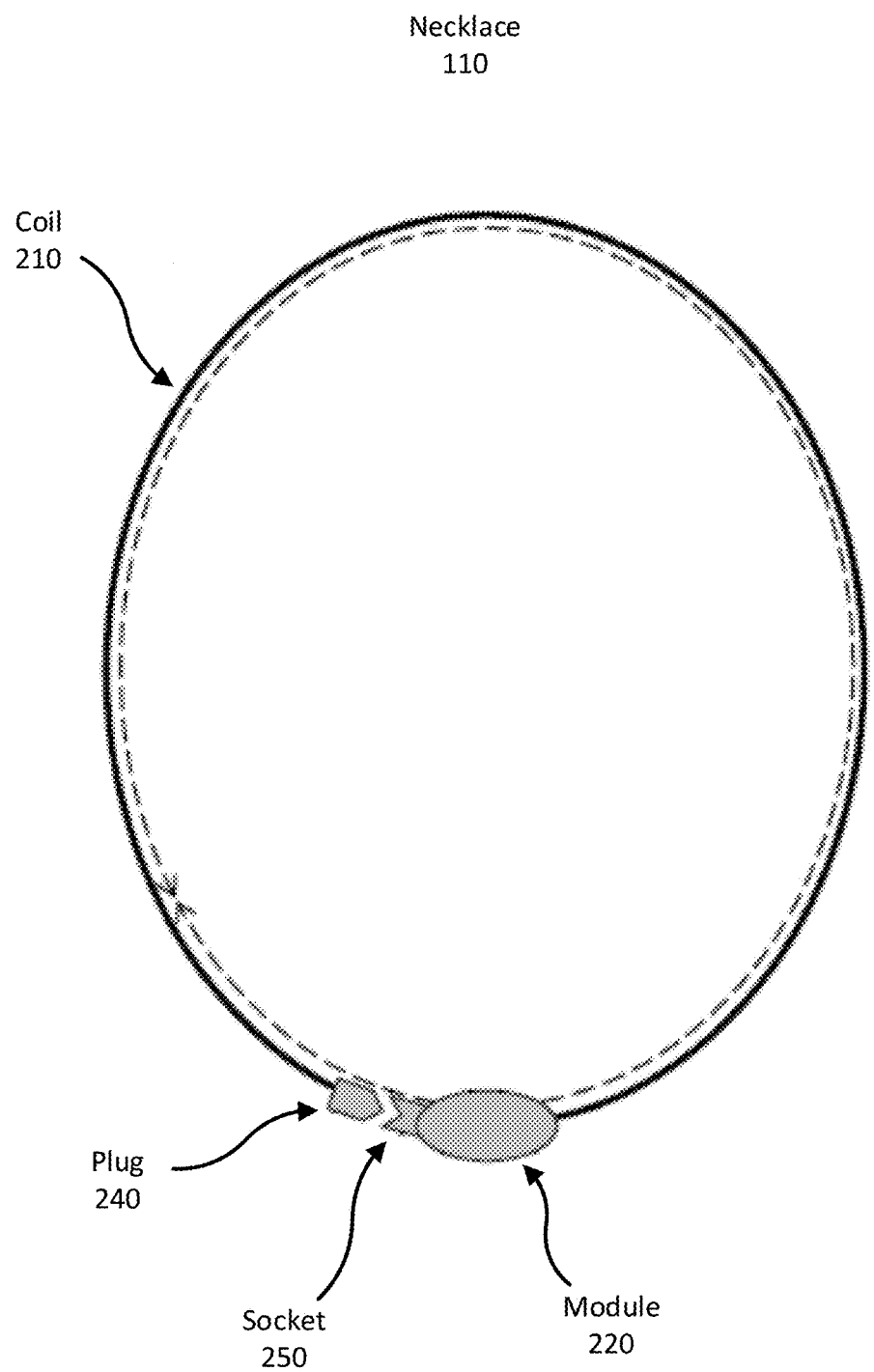
FIG. 2 is an illustration of a necklace of an augmented reality system.

FIG. 2 is an illustration of a necklace 110 of an augmented reality system 100. In the illustrated embodiment, the necklace 110 includes an electronic module 220 and a coil 210 of conductive material. The coil 210 can be connected or disconnected with a plug 240 and a socket 250, or may be a single band without the plug 240 and socket 250.

The necklace 110 includes various hardware elements, for instance within the electronic module 220, that enable functionality of the AR system 100. For example, the necklace 110 may include hardware elements that generate a TVMF for transferring power to the contact lens 120 via the head wearable object 130. Additionally, the hardware elements may include one or more of: a power source such as a battery; a modulator to drive a radio-frequency TVC in the necklace coil that can be used to inductively couple to and communicate with the contact lens 120; a data modem to encode data on the radio-frequency signal; sensors such as microphones, cameras, inertial sensors, and GPS receivers; a cellular radio; a Wi-Fi radio; a Bluetooth radio; a graphics processing unit; and a microprocessor and memory. In various configurations, the hardware elements may be included in module 220 and/or may be distributed about the necklace band. Alternatively, when the AR system 100 is connected to an external device or structure, any of the sensors, processors and other components mentioned above may be located in the device or structure.

Figure 3:
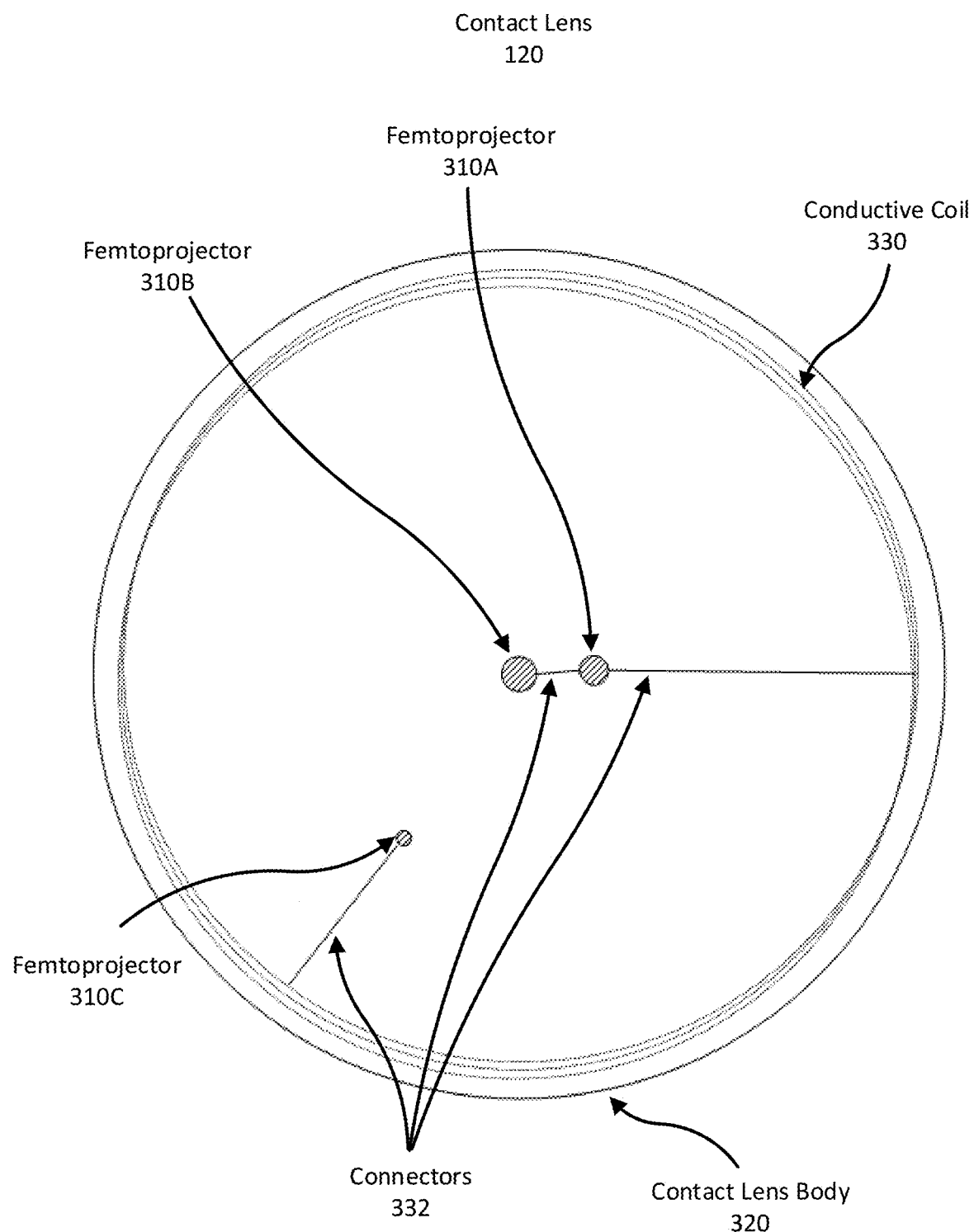
FIG. 3 is a plan view of an electronic contact lens.

FIG. 3 shows a plan view of a contact lens 120 including multiple femtoprojectors 310A-310C. Here, the contact lens shows three femtoprojectors 310A-C in the contact lens body 320, but in other embodiments, the contact lens may include many femtoprojectors (e.g., 25, 50, etc.), or may include as few as one femtoprojector. If there is only one femtoprojector 310 in a contact lens body 320, it need not be in the center of the lens. The conductive coil 330 is connected to the femtoprojectors 310 and other electronics via embedded connectors 332. The femtoprojectors 310 are located in a central region of the contact lens 120 which is surrounded by the conductive coil 330.

The entire display of the contact lens 120, made up of all the femtoprojectors, may be a variable resolution display that generates only the resolution that each region of the eye can actually see, vastly reducing the total number of individual "display pixels" required compared to displays of equal resolution and field of view that are not eye-mounted. Pixels in an eye-mounted display that are viewed by lower resolution off-foveal regions of the retina may be viewed by those lower resolution regions and, therefore, can project lower resolution pixels on the retina while still matching the eye's resolution. As a result, a 400,000 pixel eye-mounted display using variable resolution can provide the same visual experience as a fixed external display containing tens of millions of discrete pixels.

The contact lens 120 may also include other components such as antennae or optical/infrared photodetectors, data storage and buffering, controls, and a calibration system (including, for instance, a motion detection system and a display shift system). In addition, the contact lens 120 may include positioning components such as accelerometers, magnetometers, and/or gyroscopes used for motion detection, eye tracking, and/or head tracking. Finally, the contact lens 120 may also include data processing components, such as microprocessors, microcontrollers, and other data processing elements.

Power Transfer from a Necklace to an Electronic Contact Lens

Figure 4:
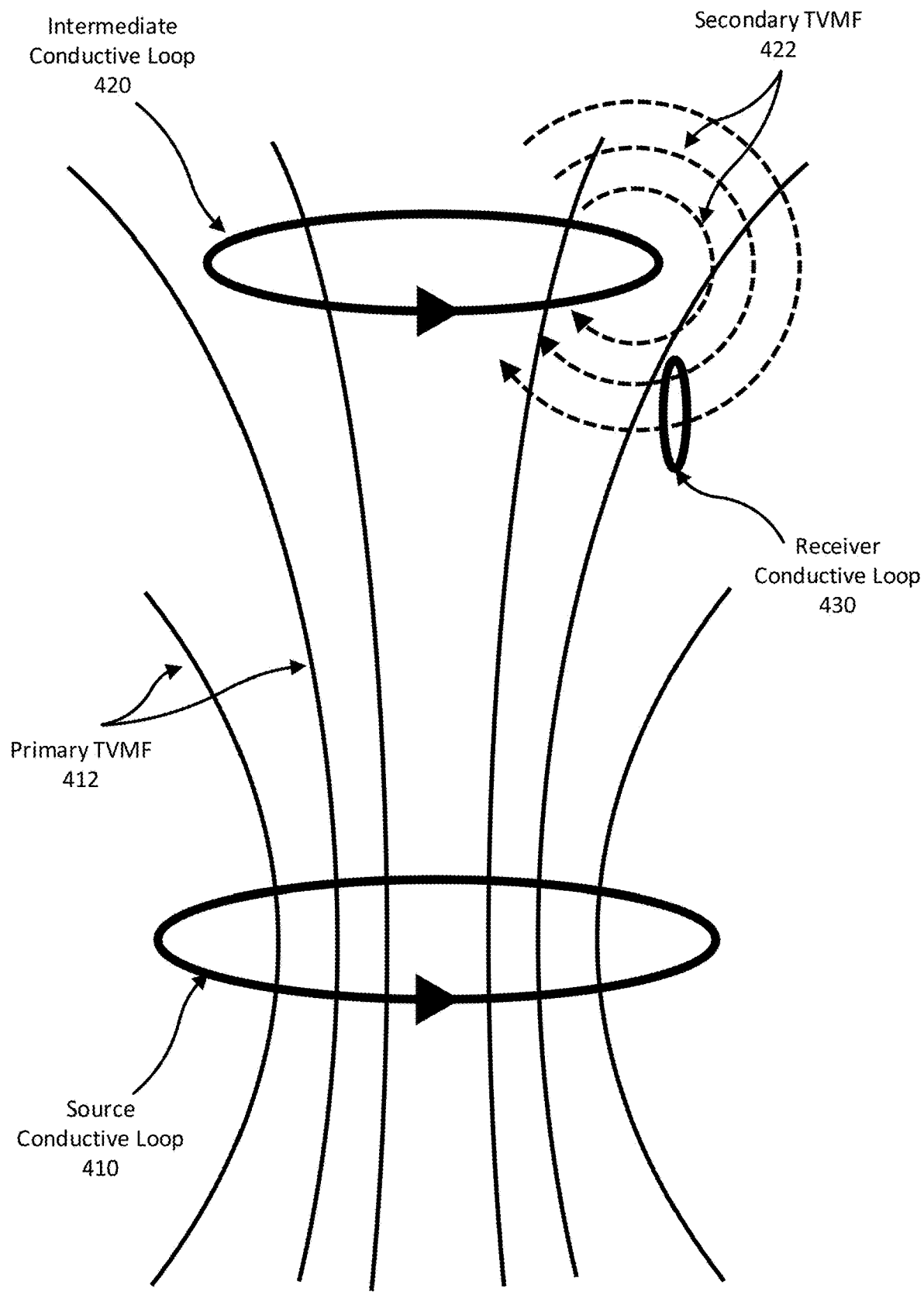
FIG. 4 is an illustration of time-varying magnetic fields generated by conductive loops of an augmented reality system.

FIG. 4 is an illustration of TVMFs generated by an AR system 100 that transfer power from a necklace 110 to an electronic contact lens 120 via a head wearable object 130. As illustrated, a source conductive loop 410 is a coil 210 of a necklace 110, an intermediate conductive loop 420 is a conductive loop embedded in a head wearable object 130, and a receiver conductive loop 430 is a conductive coil 330 embedded in a contact lens 120.

The source 410, intermediate 420, and receiver 430 conductive loops are illustrated in an orientation approximating their positions when worn by a user of an AR system 100. However, the conductive loops may be in other orientations based on the design of the AR system 100 and/or the position of the conductive loops on the user's body. Further, the conductive loops are shown as a circular shape, but could take other shapes. Each conductive loop is illustrated with a single turn, but they may include more turns and form a coil.

The AR system 100 transfers power from a source conductive loop 410 to a receiver conductive loop 430 via an intermediate conductive loop 420 using inductive coupling. More specifically, a current source (e.g., a hardware component in necklace 110) generates a source TVC current. The source TVC passes through the source conductive loop 410 such that the loop generates a primary TVMF 412.

The intermediate conductive loop 420 is inductively coupled to the source conductive loop 410 via the primary TVMF 412. The primary TVMF 412 passing through the intermediate conductive loop 420 induces an intermediate TVC in the loop.

The intermediate TVC passes through the intermediate conductive loop 420 such that the loop generates a secondary TVMF 422. That is, the intermediate conductive loop 420 produces a secondary TVMF 422 when in the presence of the primary TVMF 412.

The receiver conductive loop 430 is positioned nearer the intermediate conductive loop than the source conductive loop 410. The secondary TVMF 422 induces a first TVC in the loop. The first TVC can power components connected to the receiver conductive loop 430. Thus, the receiver conductive loop 430 can produce power for the contact lens 120 when in the presence of the secondary TVMF 422.

The source conductive loop 410 may also be inductively coupled to the receiver conductive loop 430 via the primary TVMF 412. The primary TVMF 412 passing through the receiver conductive loop 430 induces a second TVC in the loop. The second TVC can also power components connected to the receiver conductive loop 430.

The second TVC, generally, has a lower magnitude than the first TVC. The second TVC may be lower in magnitude because the source conductive loop 410 is located farther from the receiver conductive loop 430 than the intermediate conductive loop 420. Further, the second TVC may be lower in magnitude than the first TVC in instances when the relative orientation between the source conductive loop 410 and the receiver conductive loop 430 are not conducive to efficient power transfer.

An AR system 100 including a head wearable object 130 transfers wireless power more efficiently than the same AR system without the head wearable object. Consider the example of an AR system 100 worn by a user with a necklace 110 including a source conductive loop 410 worn around the neck, a head wearable object 130 (e.g., a hat) including an intermediate conductive loop 420 worn on the head, and a contact lens 120 including a receiver conductive loop 430 worn on an eye. In this example, the source conductive loop 410 and the intermediate conductive loop 420 are separated by approximately 25 cm and the intermediate conductive loop 420 is separated from the receiver conductive loop by approximately 5 cm. The necklace 110 is configured to generate a 350 mA source TVC that passes through the source conductive loop 410. In response, the total receiver TVC induced in the receiver conductive loop 430 is approximately 50 mA and generates approximately 1.0 mW of DC power for the contact lens 120. In an AR system 100 that does not include a head wearable object 130, an approximately 6.8 A source TVC is needed to achieve a 50 mA receiver TVC in the receiver conductive loop 430 and generate 1.0 mW of DC power.

Power Transfer with a Resonant Head Wearable Object

In some examples, the AR system 100 can transfer power using resonant inductive coupling. For example, a head wearable object 130 including a conductive loop may also include a capacitor (or capacitive circuit) in series with the conductive loop. The capacitor may be a variable capacitor (e.g., a switched capacitor network). The conductive loop in series with the capacitor (the "resonant loop") forms a resonant RLC circuit.

The resonant loop may resonate at a resonant frequency. The resonant frequency may be based, in part, on the resonant loop configuration. To illustrate, the resonant loop may be made to resonate at 13.56 MHz or another resonant frequency based on the selection of conductive loop material, conductive loop dimensions, capacitor size, etc.

When the resonant loop resonates at the resonant frequency, the quality factor (i.e., Q-factor, or "Q") of the resonant loop increases. The quality factor relates the maximum energy stored in the resonant loop to the energy dissipated by the resonant loop over a particular amount of time. Increasing the quality factor decreases the bandwidth of the circuit and increases the efficiency of inductive power transfer to other circuits resonating at the same resonant frequency. To illustrate, an example AR system includes a necklace configured to emit power at a first frequency $f_1$ and a contact lens 120 configured to receive power at the first frequency $f_1$. In this AR system, a head wearable 130 object includes a resonant loop with a tunable resonant frequency. When the resonant frequency of resonant loop is the first frequency $f_1$, power is transferred more efficiently from the necklace 110 to the contact lens 120 than if the resonant frequency of the resonant loop is a second, different frequency $f_2$.

The resonant frequency of a resonant loop may also depend on its surroundings. For instance, the resonant frequency of a resonant loop embedded in a hat may be different than the resonant frequency of a resonant loop that is not embedded in an object. Similarly, the resonant frequency may vary depending on the positioning of a hat that includes a resonant loop on the user's head. Changes in the resonant frequency can cause the power transfer efficiency between the necklace and the contact lens to be less than optimal. Accordingly, the head wearable object may include a controller connected to the resonant loop and configured to tune the resonant frequency of the resonant loop. The controller can automatically, or at the direction of a user, change the resonant frequency of a resonant loop.

The controller may tune the resonant frequency of a resonant loop to achieve particular outcomes. As an example, consider a head wearable object 130 including a resonant loop with a variable capacitor. The controller connected to the resonant loop may be configured to automatically tune the variable capacitor such that the resonant loop resonates at a target resonant frequency. In other examples, the controller may tune the resonant frequency to increase the amount of power delivered to the contacts lens 120, or to detune the resonant frequency to reduce the power received from the necklace 110 and, thereby, by the contact lens 120. An example of a controller capable of configuring a variable capacitor network is described in U.S. patent application Ser. No. 15/889,174 titled "Adaptive Tuning of a Contact Lens," which is incorporated by reference herein.

Example AR Systems Including Different Head Wearable Objects

FIGS. 5A-8 illustrate example AR systems 100 including different head wearable objects 130A-D. In each example AR system 100, a user wears the head wearable object 130 on his or her head, the contact lens 120 on his or her eyes, and the necklace 110 around his or her neck. In these example, the coil 210 in the necklace 110 is the source conductive loop 410, the conductive coil 330 in the contact lens 120 is the receiver conductive loop 430, and a conductive loop embedded in the head wearable object 130 is the intermediate conductive loop 430.

Figure 5A:
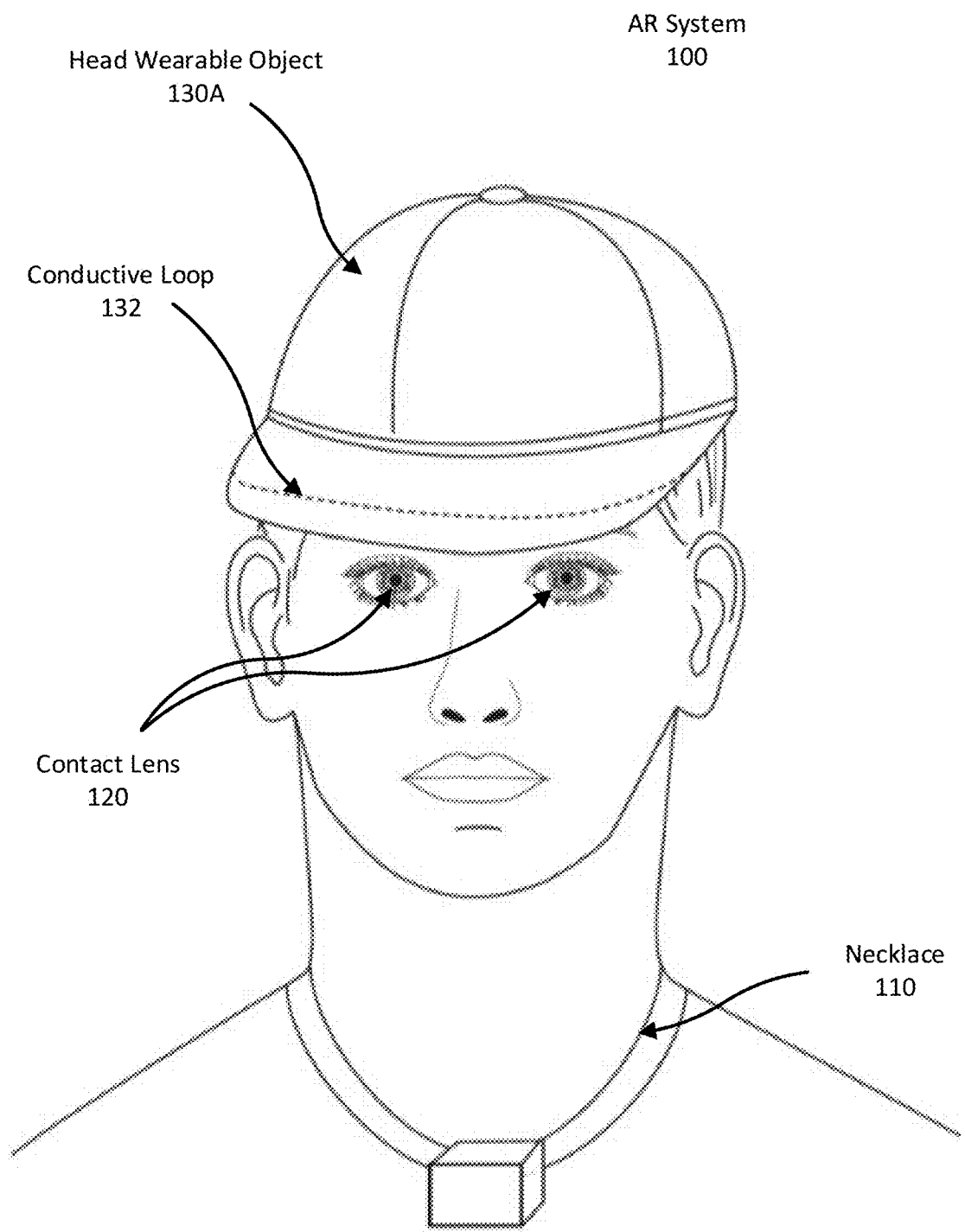
FIGS. 5A and 5B illustrate a user wearing an augmented reality system including a hat with a conductive loop.
Figure 5B:
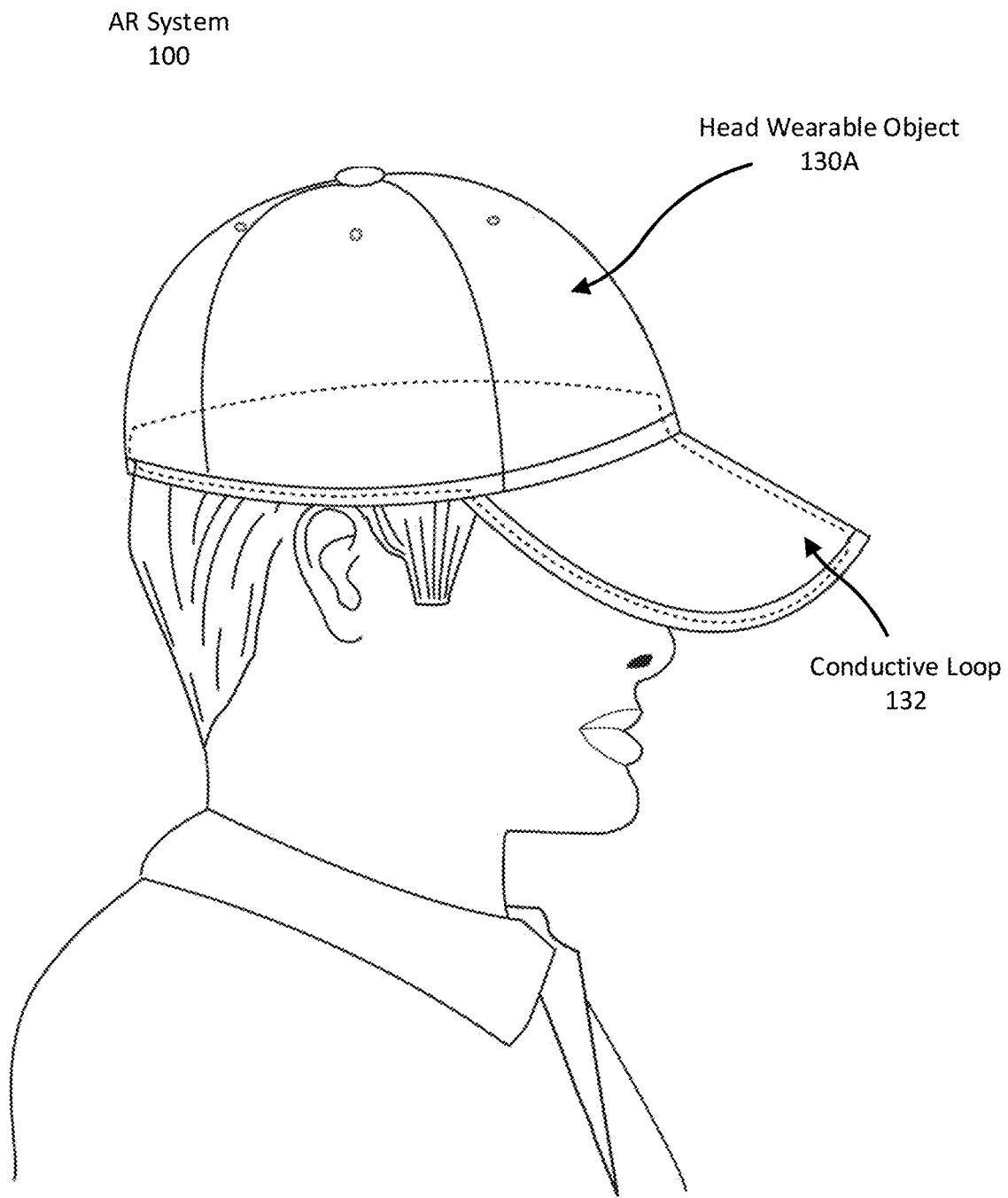

FIG. 5A illustrates a front view of a user wearing an AR system 100 including a hat (head wearable object 130A). The hat includes a conductive loop 132 embedded within its brim that is illustrated as a dashed line. The conductive loops of the AR system 100 are inductively coupled to one another such that the necklace 110 can provide power to the contact lens 120 via the conductive loop 132 in the hat. FIG. 5B illustrates a side view of the user wearing the AR system 100 in FIG. 5A that shows the entirety of the conductive loop 132 embedded within the hat. In particular, the conductive loop 132 is embedded around the brim and bottom edge of the hat such that the conductive loop 132 forms a loop on top of the user's head.

Figure 6A:
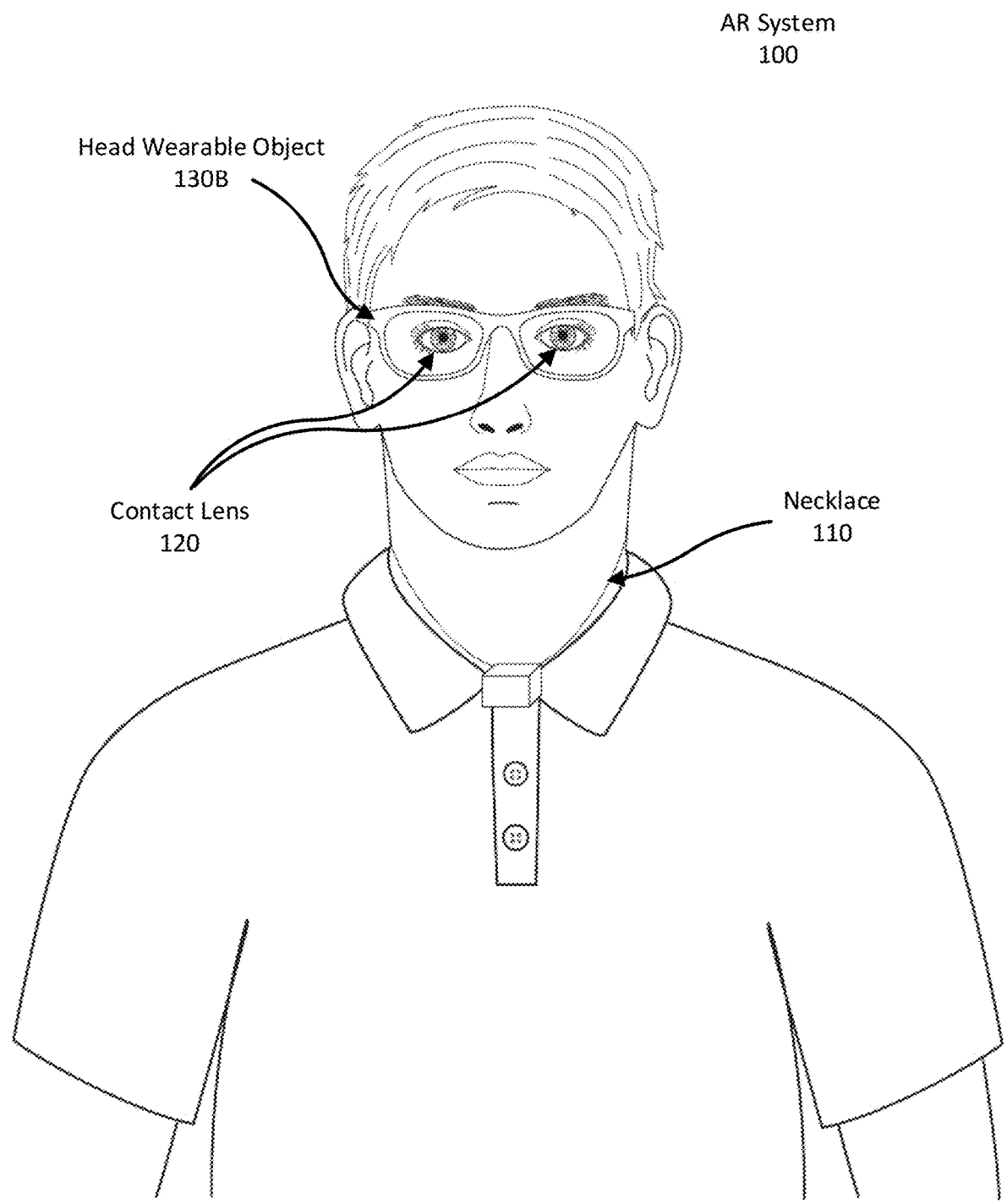
FIG. 6A illustrates a user wearing an augmented reality system including a pair of glasses with a conductive loop.

FIG. 6A illustrates a user wearing an AR system 100 including a pair of eyeglasses (head wearable object 130B). The eyeglasses include a conductive loop (not illustrated) embedded within the frames and an eyeglasses strap (not illustrated). The conductive loops of the AR system 100 are inductively coupled to each other such that the necklace 110 can provide power to the contact lens 120 via the conductive loop in the eyeglasses.

FIGS. 6B and 6C each illustrate a pair of eyeglasses that include a conductive loop. In FIG. 6B, a conductive loop 132 is embedded in the eyeglasses along a top edge of the frames, a top edge of the temples, and in a strap connecting the temple tips (not shown). In FIG. 6C, a conductive loop 132 is embedded in the eyeglasses along a top edge of the frames, encircling the lenses, along a top edge of the temples, and in a strap connecting the temple tips (not illustrated). In this example, the arrows on the conductive loop 132 indicate a direction in which the conductive loop may be wound through the eyeglasses. Additionally, the eyeglasses show a second conductive loop 132 within the lenses that can function as a second intermediate conductive loop 420.

FIG. 6C also illustrates a controller 134 connected to the conductive loop 132. If, for example, the conductive loop 132 is a resonant loop, the controller 134 may be configured to tune the resonant frequency of the conductive loop 132. As an example, the controller 134 may include a circuit to determine the capacitance of the resonant loop. Based on the determined capacitance, the controller 134 may modify the capacitance of a switched capacitance network to tune the capacitance of the conductive loop 132. The controller 134 may tune the capacitance to a resonant frequency and increase the quality factor of the conductive loop 132.

In a similar embodiment to FIG. 6C, a pair of eyeglasses for an AR system may include conductive loops along the rims of the lenses and/or within the lenses. In other words, the conductive loop 132 may not extend along the temples and/or the strap. In this embodiment, the conductive loop 132 may be nearer the conductive loop of a contact lens and improve power transfer.

Figure 7:
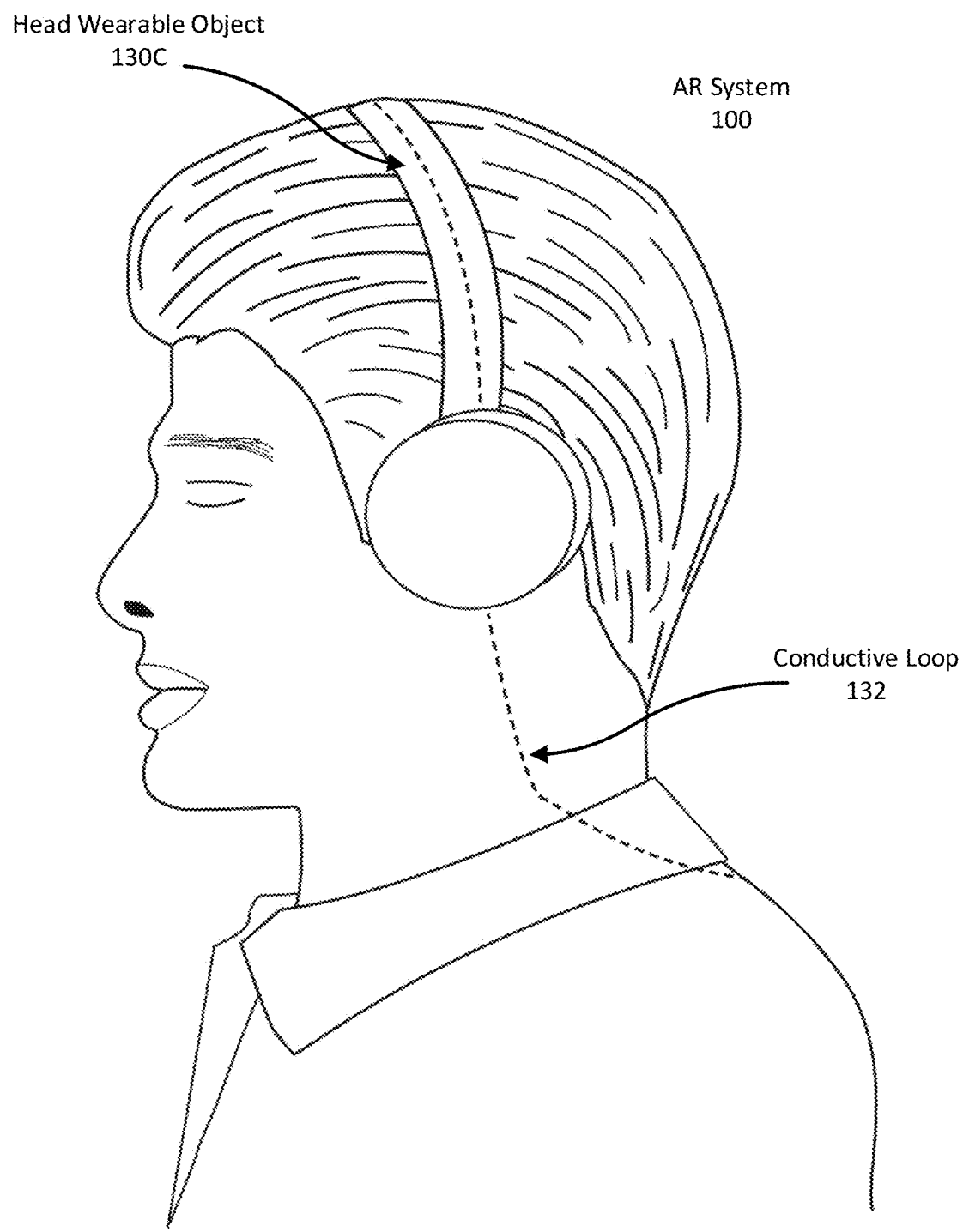
FIG. 7 illustrates a user wearing an augmented reality system including a set of headphones with a conductive loop.

FIG. 7 illustrates a user wearing an AR system 100 including a pair of headphones (head wearable object 130C). A conductive loop 132 is embedded within the headband, cushions, and strap (not illustrated) of the headphones. The conductive loops of the AR system 100 are inductively coupled to each other such that the necklace 110 can provide power to the contact lens 120 via the conductive loop 132 in the headphones.

Figure 8:
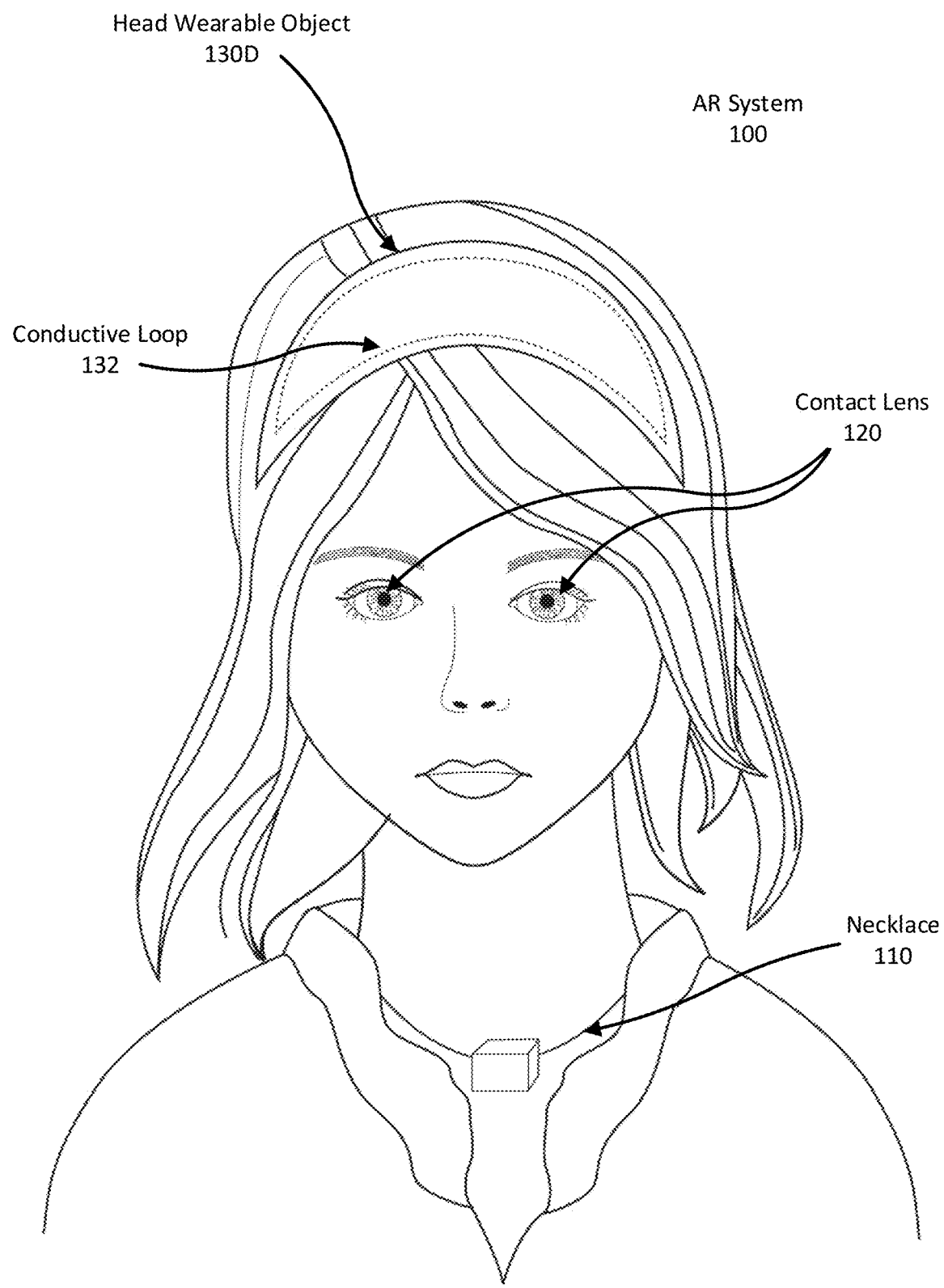
FIG. 8 illustrates a user wearing an augmented reality system including a headband with a conductive loop.

FIG. 8 illustrates a user wearing an AR system 100 including a headband (head wearable object 130D). A conductive loop 132 is embedded around an outer edge of the headband. The conductive loops of the AR system 100 are inductively coupled to each other such that the necklace 110 can provide power to the contact lens 120 via the conductive loop 132 in the headband.

Feedback Systems

Figure 9:
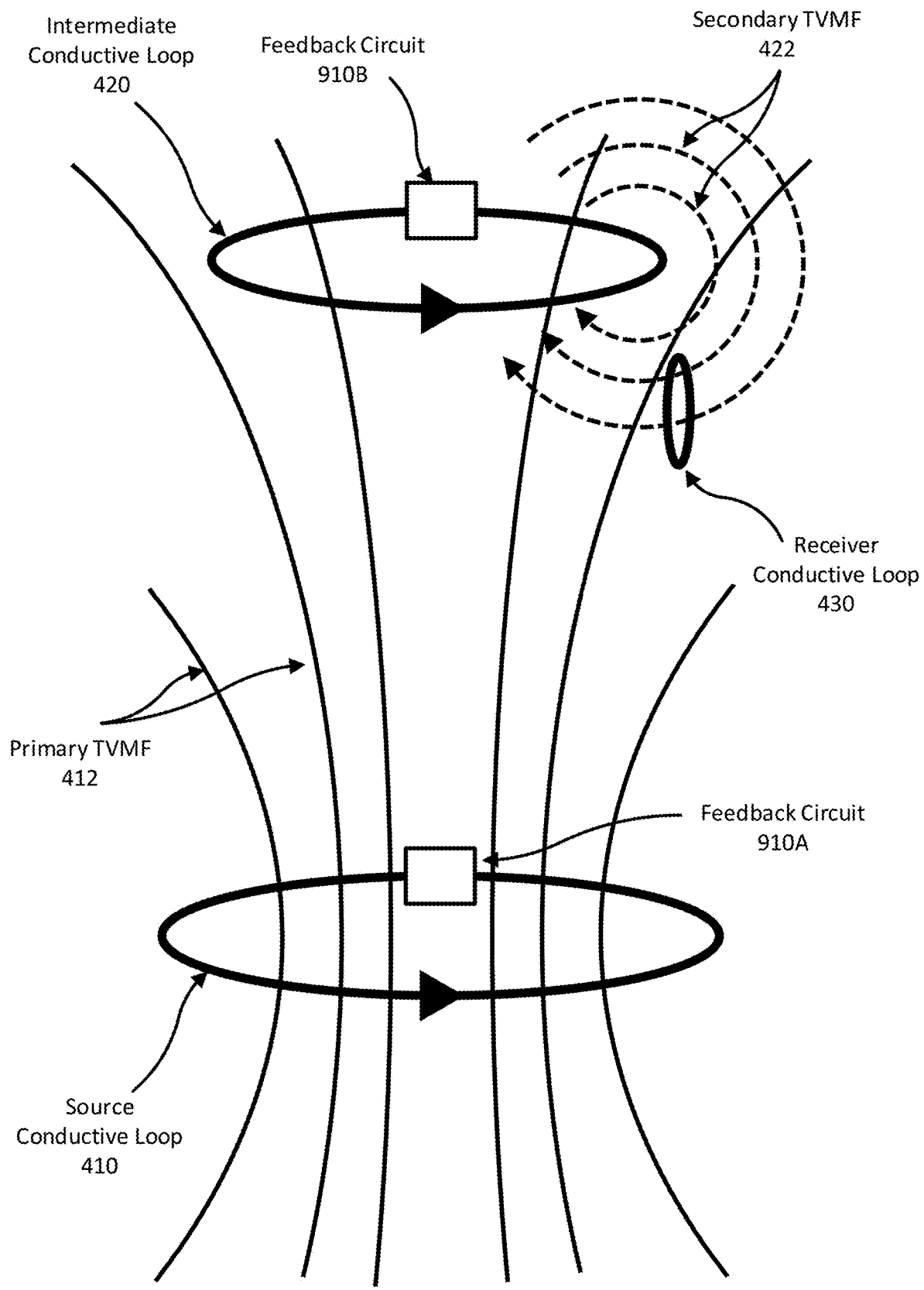
FIG. 9 is an illustration of the time varying magnetic fields generated by conductive loops of an augmented reality system including a feedback system.

FIG. 9 is an illustration of the TVMFs generated in an AR system that includes a feedback system.

FIG. 9 is similar to FIG. 4 in that a source conductive loop 410 generates a primary TVMF 412, the primary TVMF 412 induces the intermediate conductive loop 420 to generate a secondary TVMF 422, and the secondary TVMF 422 induces the receiver conductive loop 430 to generate a TVC. However, unlike FIG. 4, the AR system 100 of FIG. 9 includes a feedback system.

The feedback system includes a feedback circuit 910A connected to the source conductive loop 410 and a feedback circuit 910B connected to the intermediate conductive loop 420. In other examples, the AR system 100 may include a single feedback circuit 910 connected to the source conductive loop 410 or the intermediate conductive loop 420.

A feedback circuit 910 is configured to send and/or receive information between inductively coupled loops. Generally, the feedback circuit 910 receives information by measuring and/or determining variations in parameters of a conductive loop (e.g., capacitance, inductance), of a TVMF (e.g., magnitude, frequency, etc.), of a TVC (e.g., magnitude, frequency, etc.), or of inductive coupling (e.g., Q-factor) that may convey information. For example, a TVMF passing through a conductive loop may be modulated to encode information and, as such, the feedback circuit 910 can obtain the encoded information from the resulting induced TVC. Similarly, a feedback circuit 910 can transmit information by changing parameters of a conductive loop, TVMF, TVC, or inductive coupling the may convey information. For example, a feedback circuit 910 connected to a conductive loop may encode information by modulating a TVC. As the modulated TVC passes through the conductive loop, the conductive loop generates a TVMF that includes the encoded information.

In some examples, the feedback circuit 910 can include a sensor. The sensor may be a touch sensor, such as, for example, a button, switch, dial, or similar input device. The sensor is located on an external surface of a necklace 110 and/or head wearable object 130. The sensor is configured to receive input from a user wearing the AR system 100. Based on the input received at the sensor, the feedback circuit 910 may transmit information that may affect functionality of the AR system 100. For example, a user may press a button on the necklace 110 which causes a feedback circuit 910 coupled to a source conductive loop 410 to transmit a photograph that, when received, causes a contact lens 120 to display the photograph.

In some configurations, the sensor may directly affect parameters of the conductive loop, TVMF, TVC, or inductive coupling to convey information within the AR system. For example, a head wearable object 130 including an intermediate conductive loop 420 may generate a secondary TVMF 422 in the presence of a primary TVMF 412. The head wearable object 130 includes a feedback circuit 910 with a sensor that is, for example, a capacitive switch on an external surface of the head wearable object 130. A user presses the capacitive switch, the capacitance of the intermediate conductive loop 420 is changed, which in turn changes the generated secondary TVMF 422. The AR system 100 is configured to determine the induced change in the capacitance of the intermediate conductive loop 420 and may take actions in response. For example, a feedback circuit 910 connected to a source conductive loop 410 may detect a change in the capacitance of the intermediate conductive loop 420 and may stop generating a primary TVMF 412 in response.

Figure 10A:
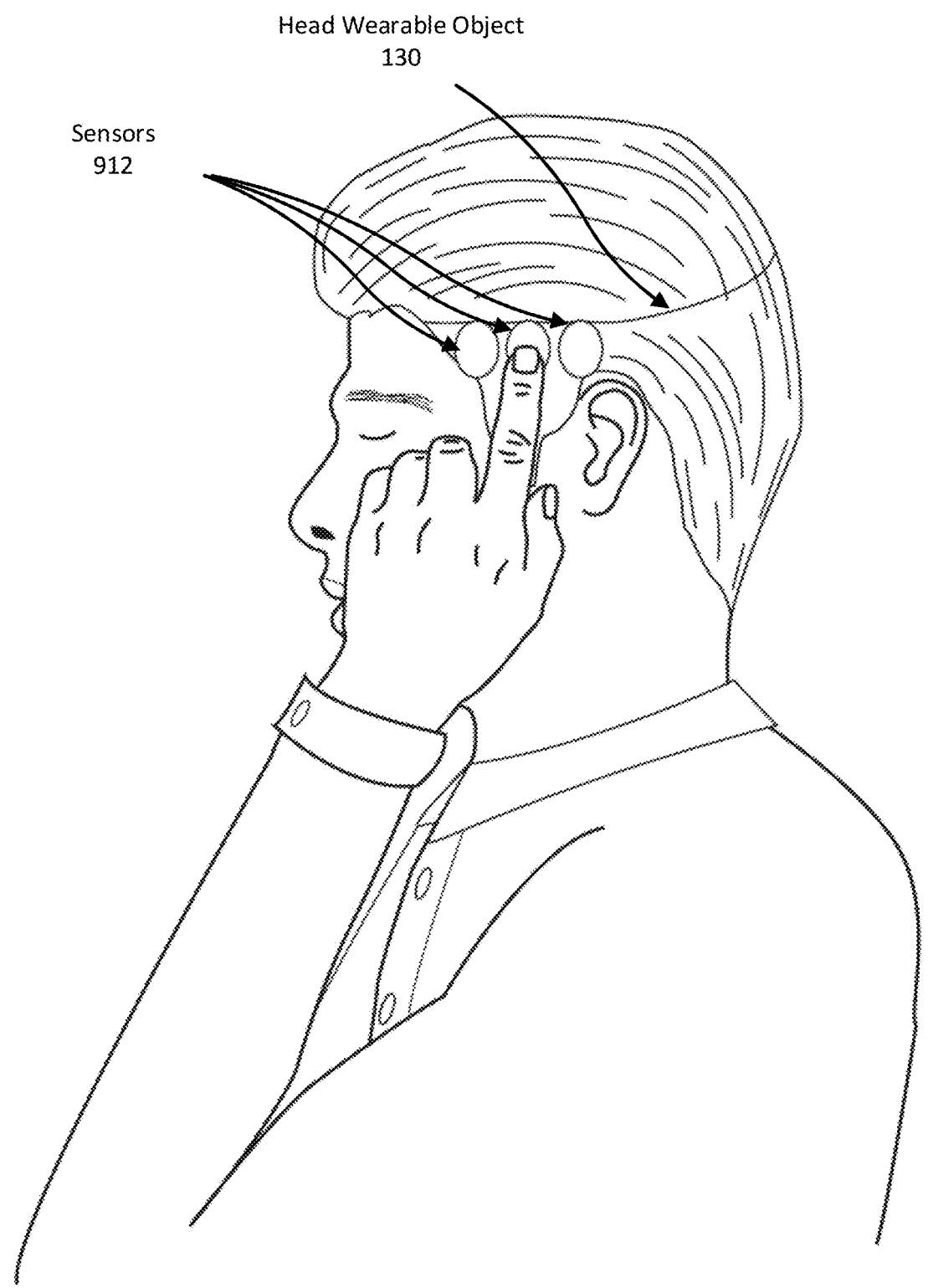
FIGS. 10A and 10B illustrates a user wearing an augmented reality system including a feedback system.

FIG. 10A illustrates a side view of a user wearing an AR system including a head wearable object with a feedback circuit. Here, the contact lens 120 and necklace 110 are not shown. In this example, the feedback circuit includes three sensors 912. Each sensor 912 may change a different parameter of the AR system 100 when pressed by the user to convey information. In this example, as the user presses a sensor 912, a clock image may be displayed in his augmented reality.

Figure 10B:
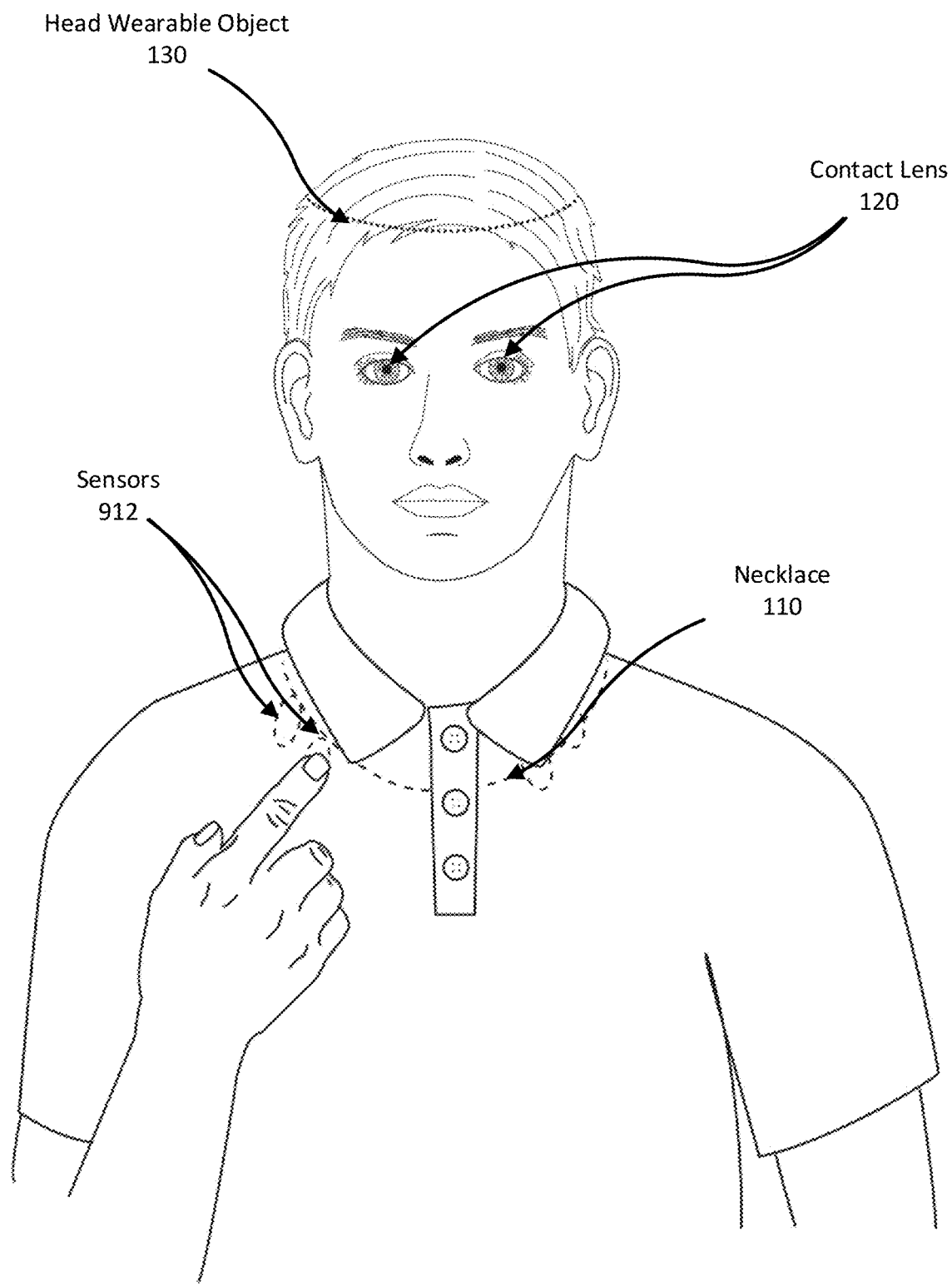

FIG. 10B illustrates a front view of a user wearing an AR system including a head wearable object. In this embodiment, the necklace 110 includes a feedback circuit with a number of sensors 912. A user may press a sensor 912 to, for example, cause a photograph to be displayed in his augmented reality.

Additional Considerations

Although the detailed description contains many specifics, these should not be construed as limiting the scope of the invention but merely as illustrating different examples. It should be appreciated that the scope of the disclosure includes other embodiments not discussed in detail above. For example, the technologies described are applicable to eye-mounted displays other than the specific types described above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A system comprising:
a first conductive loop configured to be worn around a neck of a user and to produce a first time-varying magnetic field;
a second conductive loop configured to be worn on a head of the user and to produce a second time-varying magnetic field that results from inductive coupling of the second conductive loop to the first conductive loop via the first time-varying magnetic field when the second conductive loop is in the presence of the first time-varying magnetic field; and
an electronic contact lens comprising a third conductive loop and for projecting images onto a retina of the user's eye, the third conductive loop configured to produce power when in the presence of the first time-varying magnetic field and the second time-varying magnetic field.

2. The system of claim 1, wherein the first conductive loop comprises a necklace including a power source, the power source configured to drive current through the first conductive loop to produce the first time-varying magnetic field.

3. The system of claim 1, wherein the second conductive loop is closer to the third conductive loop than the first conductive loop.

4. The system of claim 2, wherein the necklace includes a feedback circuit connected to the first conductive loop, the feedback circuit for changing a parameter of the first conductive loop.

5. The system of claim 4, wherein the parameter of the first conductive loop changes in response to the user touching the feedback circuit.

6. The system of claim 4, wherein the feedback circuit further comprises:
a transmitter configured to transmit information to the third conductive loop in the contact lens when the parameter of the first conductive loop changes.

7. The system of claim 4, feedback circuit further comprises:
a receiver configured to receive information from the second conductive loop worn on the head of the user.

8. The system of claim 1, wherein the second conductive loop is embedded in one of: a hat, a head band, a pair of glasses, or a pair of headphones.

9. The system of claim 1, wherein second conductive loop is connected to a feedback circuit, the feedback circuit for changing a parameter of the second conductive loop.

10. The system of claim 9, wherein the parameter of the second conductive loop changes in response to the user touching the feedback circuit.

11. The system of claim 9, wherein the feedback circuit further comprises:
a transmitter configured to transmit information to the third conductive loop in the contact lens when the parameter of the second conductive loop changes.

12. The system of claim 9, wherein the feedback circuit further comprises:
a transmitter configured to transmit information to the first conductive loop in the contact lens when the parameter of the second conductive loop changes.

13. The system of claim 9, wherein the feedback circuit further comprises:
a receiver configured to receive information from the first conductive loop in the necklace.

14. The system of claim 1, further comprising:
a capacitor connected to the second resonant loop, and wherein the second conductive loop resonates at a resonant frequency.

15. The system of claim 14, further comprising:
a controller connected to the second resonant loop, the controller configured to tune the capacitance of the second resonant loop by changing the capacitance of the capacitor.

16. A system comprising:
a first conductive loop configured to be worn around a neck of a user and to produce a first time-varying magnetic field that produces power in a second conductive loop of an electronic contact lens for projecting images onto a retina of a wearers eye;
a third conductive loop configured to be worn on a head of the user and to produce a second time-varying magnetic field that results from inductive coupling of the third conductive loop to the first conductive loop via the first time-varying magnetic field when the third conductive loop is in the presence of the first time-varying magnetic field, the second time-varying magnetic field producing power in the second conductive loop of the electronic contact lens.

17. The system of claim 14, wherein the second conductive loop is closer to the third conductive loop than the first conductive loop.

18. The system of claim 14, wherein the first conductive loop comprises a necklace including a power source, the power source configured to drive current through the first conductive loop to produce the first time-varying magnetic field.

19. The system of claim 15, wherein the necklace includes a feedback circuit connected to the first conductive loop, the feedback circuit for changing a parameter of the first conductive loop.

20. The system of claim 15, wherein the parameter of the first conductive loop changes in response to physical contact.

21. The system of claim 2, wherein the second conductive loop does not include a power source.

* * * * *